United States Patent
Duesel, Jr. et al.

(10) Patent No.: US 8,623,174 B1
(45) Date of Patent: Jan. 7, 2014

(54) LIQUID EVAPORATION SYSTEM WITH HEATED LIQUID

(71) Applicant: Heartland Technology Partners LLC, St. Louis, MO (US)

(72) Inventors: Bernard F. Duesel, Jr., Goshen, NY (US); Craig Clerkin, Stoughton, WI (US)

(73) Assignee: Heartland Technology Partners LLC, St. Louis, MO (US)

( * ) Notice: Subject to any disclaimer, the term of this patent is extended or adjusted under 35 U.S.C. 154(b) by 0 days.

(21) Appl. No.: 13/715,213

(22) Filed: Dec. 14, 2012

(51) Int. Cl.
*B01D 1/12* (2006.01)
*B01D 1/14* (2006.01)
*B01D 3/00* (2006.01)
*C02F 1/16* (2006.01)

(52) U.S. Cl.
USPC ............. 159/47.3; 159/16.1; 159/32; 159/38; 202/167; 202/235; 203/12; 210/805; 210/167.32; 210/180; 261/151; 261/77; 261/120; 261/121.1

(58) Field of Classification Search
USPC ........... 159/16.1, 16.2, 29, 32, 38, 47.1, 47.3; 202/63, 167, 233, 235; 203/10, 12; 210/774, 805, 167.01, 167.32, 180, 210/194; 261/138, 140.1, 151, 159, 77, 261/120, 121.1
See application file for complete search history.

(56) References Cited

U.S. PATENT DOCUMENTS

| | | | | |
|---|---|---|---|---|
| 2,372,846 A * | 4/1945 | Nettel et al. | ................... | 202/152 |
| 3,203,875 A * | 8/1965 | Sturtevant | ..................... | 202/173 |
| 3,299,651 A * | 1/1967 | McGrath | ............................ | 62/93 |
| 3,880,756 A * | 4/1975 | Raineri et al. | .................. | 210/97 |
| 4,001,077 A | 1/1977 | Kemper | | |
| 4,264,826 A * | 4/1981 | Ullmann | ........................... | 290/2 |
| 4,613,409 A * | 9/1986 | Volland | .......................... | 203/10 |
| 4,693,304 A * | 9/1987 | Volland | .......................... | 165/88 |
| 5,176,798 A * | 1/1993 | Rodden | ......................... | 202/159 |
| 5,183,563 A * | 2/1993 | Rodden | ......................... | 210/180 |
| 5,630,913 A * | 5/1997 | Tajer-Ardebili | .............. | 202/176 |
| 5,695,614 A * | 12/1997 | Hording et al. | ................. | 203/10 |
| 5,695,643 A * | 12/1997 | Brandt et al. | .................. | 210/652 |
| 5,925,223 A * | 7/1999 | Simpson et al. | ................. | 203/11 |
| 6,500,216 B1 | 12/2002 | Takayasu | | |
| 6,919,000 B2 * | 7/2005 | Klausner et al. | ............... | 203/10 |
| 6,936,140 B2 * | 8/2005 | Paxton et al. | .................. | 202/160 |
| 7,073,337 B2 * | 7/2006 | Mangin | ........................... | 60/783 |
| 7,166,188 B2 | 1/2007 | Kedem et al. | | |
| 7,225,620 B2 * | 6/2007 | Klausner et al. | ............. | 60/641.1 |
| 7,416,172 B2 * | 8/2008 | Duesel et al. | ................... | 261/77 |

(Continued)

FOREIGN PATENT DOCUMENTS

JP 60257801 A * 12/1985 ............... B01D 1/26
WO WO 2011050317 A2 * 4/2011 ............... C02F 1/14

*Primary Examiner* — Nina Bhat
*Assistant Examiner* — Jonathan Miller
(74) *Attorney, Agent, or Firm* — Marshall, Gerstein & Borun LLP (57) ABSTRACT

A liquid evaporation system for evaporating clean water from a reservoir of wastewater includes a liquid evaporator to evaporate and separate water vapor from the wastewater in a confined space, an air blower to supply air to the liquid evaporator, and a wastewater heating system arranged to collect heat to heat the wastewater in the reservoir.

26 Claims, 6 Drawing Sheets

(56) References Cited

U.S. PATENT DOCUMENTS

| | | | |
|---|---|---|---|
| 7,442,035 B2 | 10/2008 | Duesel, Jr. et al. | |
| 7,614,367 B1* | 11/2009 | Frick | 122/26 |
| 7,832,714 B2* | 11/2010 | Duesel et al. | 261/77 |
| 8,136,797 B2* | 3/2012 | Duesel et al. | 261/77 |
| 2005/0230238 A1* | 10/2005 | Klausner et al. | 203/10 |
| 2008/0173176 A1* | 7/2008 | Duesel et al. | 95/226 |
| 2008/0174033 A1* | 7/2008 | Duesel et al. | 261/121.1 |
| 2008/0265446 A1* | 10/2008 | Duesel et al. | 261/136 |
| 2008/0272506 A1* | 11/2008 | Duesel et al. | 261/136 |
| 2010/0139871 A1 | 6/2010 | Rasmussen et al. | |
| 2011/0147195 A1* | 6/2011 | Shapiro et al. | 203/10 |
| 2011/0168646 A1* | 7/2011 | Tafoya | 210/774 |

* cited by examiner

LIQUID EVAPORATION SYSTEM WITH HEATED LIQUID

FIELD OF THE DISCLOSURE

The present invention relates to devices, systems, and methods for evaporating and separating water vapor from wastewater.

BACKGROUND

Industrial processes often create and use a significant amount of thermal energy to heat various processes and also use significant amounts of water for many varied processes. Common byproducts of these industrial processes are, among other things, significant amounts of exhaust heat and contaminated liquids and/or contaminated water, or simply wastewater. The exhaust heat is commonly exhausted to the surrounding atmosphere, which frequently results in a significant waste in thermal energy. Wasting such thermal energy is both monetarily a net loss from the industrial process and usually increases the so-called "carbon footprint" or energy usage profile of the industrial process.

Further, the wastewater usually needs to be treated at some point, either at the site of the industrial process or at a location remote from the industrial process, to remove the contaminants from the water and/or other liquids. To treat wastewater, for example, it is common to separate the water from the contaminants to meet various purity targets or to reduce the volume of liquid water within a reservoir of wastewater. Such contaminants may include, for example, salts, sulfur, heavy metals, suspended soils, human or animal waste, oils, fertilizers, pharmaceuticals, acid and any other undesirable matter as would be apparent to a person of skill in the art. This treatment of the wastewater takes additional energy, further adding to the energy usage profile of the industrial process.

Outdoor open liquid reservoirs, such as retention ponds, aeration reservoirs, dry ponds, open-topped tanks, and the like, are often used to temporarily store wastewater that contains undesirable levels of contaminants until the wastewater can be treated to separate the contaminant from the water. After separation, the cleaned water can be released to the environment or otherwise used as desired, and the contaminants and/or concentrated wastewater can be further processed, recycled, transported to an appropriate landfill, and/or otherwise disposed of.

One commonly used method of at least initially separating non-volatile contaminants from the water is to evaporate the water from the wastewater, thereby releasing relatively clean water into the atmosphere in the gaseous state in the form of water vapor while the contaminants are retained and/or recaptured in the reservoir. Depending on the circulation of wastewater into the reservoir, after some period of time the water is either completely evaporated, thereby leaving the contaminants remaining in the reservoir for easy collection and disposal, or the concentration of contaminants is elevated to a point, which may exceed saturation in terms of the solubility of one or more contaminants, where it becomes economically advantageous to further process and/or separate the highly concentrated wastewater in other ways.

Although the water evaporates naturally at the surface of a pond or other open reservoir, it is often desirable to increase the rate of evaporation to decrease the processing time of the wastewater in order to increase economic efficiencies. Thus, it is common to place a reservoir evaporator system directly in the reservoir that effectively accelerates evaporation of the water to the surrounding environment by, for example, increasing the surface area to volume ratio of the wastewater to the surrounding air. There are many ways to accomplish this, and of course, the efficacy of this evaporative treatment method is highly dependent on many variables other than the evaporator system, including flow rate of wastewater into or through the reservoir, humidity levels of the surrounding environment, the liquid to be evaporated, and temperature, to name a few.

One known type of reservoir evaporator system uses nozzles to spray a fine mist of droplets of the wastewater up into the air above the top surface of the reservoir. Under ideal conditions, the water in the droplets evaporates into the surrounding atmosphere more quickly than from the top surface because of the increased surface area to volume ratio, and the contaminants and any un-evaporated droplets fall back into the reservoir. An exemplary reservoir evaporation system generally incorporating this design is disclosed in U.S. Patent Application Publication No. 2010/0139871 to Rasmussen et al.

Another known type of reservoir evaporator system floats on the top surface of the reservoir and includes a spinning agitator for scooping wastewater from the top surface and sprinkling it into the air. The agitator is connected to a source of high pressure air that spins the agitator by means of thrust nozzles, and the exhaust from the thrust nozzles may be directed to further impact the wastewater sprinkled into the air to further accelerate evaporation. An exemplary reservoir evaporation generally incorporating this design is disclosed in U.S. Pat. No. 4,001,077 to Kemper.

A further known type of reservoir evaporator system that dispenses with the use of high pressure air exposes evaporation surfaces that have been wetted with the wastewater to the air and wind. One exemplary reservoir evaporation system generally incorporating this design is disclosed in U.S. Pat. No. 7,166,188 to Kadem et al.

Although these known systems do accelerate the evaporation and therefore separation of water from a reservoir of wastewater, among other significant limitations, they frequently use a large amount of energy to do so.

SUMMARY

According to some aspects of the disclosure, a liquid evaporation system useful for evaporating water vapor from wastewater includes a liquid evaporator adapted to evaporate and separate water vapor from the wastewater, an air blower for supplying ambient temperature or heated air to the liquid evaporator for forming the water vapor, and a heating system for heating the wastewater above ambient temperature.

According to further aspects of the disclosure, a wastewater evaporation system includes a large reservoir that feeds wastewater to a smaller, preferably insulated, thermal holding tank. The thermal holding tank is connected to a heating loop. The heating loop is operatively connected to a waste heat source and is used to heat the wastewater being held in the thermal holding tank. The thermal holding tank optionally may be insulated. Heated wastewater from the thermal holding tank is supplied to a liquid evaporator. Water vapor is exhausted from the liquid evaporator. Optionally, discharge of more concentrated wastewater is removed from the liquid evaporator.

According to yet further aspects of the disclosure, a method of evaporating water vapor from a reservoir of wastewater includes any one or more of the steps of: evaporating the water vapor with a liquid evaporator including a direct contact adiabatic evaporation system; and heating the wastewater with waste heat from an industrial process. The step of evaporating optionally includes the steps of blowing ambient temperature air into an air dispersion chamber within a vessel disposed in or containing the wastewater, and exhausting water vapor from the air dispersion chamber through an exhaust port, preferably to atmosphere. The step of heating optionally includes collecting exhaust heat energy from the industrial process and transferring the collected exhaust heat energy to the reservoir. The step of heating may be continual or intermittent. The industrial process may include any one or more of the industrial processes discussed herein. The method may be implemented with any variation of the systems for evaporating water vapor from a reservoir of wastewater disclosed herein.

According still further aspects of the disclosure, a method of evaporating water vapor from a large reservoir of wastewater includes one or more of the steps of: transferring the wastewater from the large reservoir to a thermal holding tank that is smaller than the large reservoir; circulating the wastewater in the thermal holding tank through a heating loop; heating the wastewater circulating through the heating loop; transferring heated wastewater from the thermal holding tank to a liquid evaporator; vigorously mixing the heated wastewater with ambient temperature or heated air with the liquid evaporator to evaporate water vapor from the wastewater; and exhausting the water vapor from the liquid evaporator.

Any of these and other aspects of the disclosure may further include any one or more of the following optional preferred arrangements.

In some optional preferred arrangements, the heating system includes a waste heat source from an industrial process and/or is arranged to collect waste heat from an industrial process to heat the wastewater in the reservoir. The industrial process may include an electrical power generation plant, manufacturing facility, refining facility, waste handling facility, and/or other industrial process that creates waste heat. The waste heat may include low pressure steam turbine exhaust and/or combustion exhaust gases. The electric power generation plant may be a coal fired plant.

In some optional preferred arrangements, the heating system includes a heat exchanger to be hydraulically connected with the wastewater in the open reservoir and/or the thermal holding tank and with the waste heat source from the industrial process to heat the wastewater. The heating system may include a pump to circulate wastewater from the open reservoir and/or thermal holding tank through the heat exchanger and back to the respective reservoir and/or thermal holding tank. The heat exchanger may be arranged to heat the wastewater with heat from the waste heat source. The pump may be arranged to and pump the heated wastewater from the heat exchanger to the reservoir.

In some optional preferred arrangements, the waste heat may be transferred from a source of the waste heat to the heat exchanger directly and/or indirectly. A direct heat transfer system may include a fluid line that is arranged to transfer heated process fluid, such as turbine exhaust steam or hot water or oil, directly to the heat exchanger. An indirect heat transfer system may include a heat transfer circulation loop adapted to collect heat from a waste heat source. The heat transfer circulation loop may include a second heat exchanger to collect waste heat from combustion exhaust gases near the source of the combustion exhaust gases in heat exchange liquid, and a closed loop hydraulic line to circulate the heat exchange liquid between the first and second heat exchangers. The heat exchange liquid may include liquids and/or gases. An indirect heat transfer system may include a vapor compression loop. The vapor compression loop may include an evaporator arranged to collect heat from the low pressure steam turbine exhaust or low temperature combustion exhaust gas, a compressor to compress vapor from the evaporator, a condenser connected to the compressor and formed as part of the reservoir heater to heat the wastewater, and an expansion valve to cool vapor from the condenser and supply liquid to the evaporator.

In some optional preferred arrangements, other industrial processes and waste heat sources may be used; preferably processes that generate and/or use large amounts of heat, such as from burning hydrocarbon fuels or use of nuclear fuels. Some additional and non-limiting exemplary industrial processes include petrochemical refining facilities, steel and other metal production facilities, chemical processing facilities, manufacturing facilities, and solid waste processing and/or decomposition facilities. The waste heat may be generated by or captured from, for example, boilers, heaters, cooling liquids, ovens, furnaces, chemical reactions, and so on. The industrial process may include a power generation plant. The power generation plant may include an internal combustion engine and/or a gas fired jet turbine and/or boiler.

The liquid evaporator preferably includes a direct contact adiabatic evaporator or evaporation system that directly contacts air and/or other gases and liquids such that water vapor is evaporated into the gases. The liquid evaporator may have other forms and/or components and/or principles of operation.

In some optional preferred arrangements, the liquid evaporator includes a draft tube evaporator. The draft tube evaporator vigorously mixes a discontinuous mass of air in a continuous mass of wastewater, such as by injecting air from the draft tube into a mass of wastewater, thereby forming a discontinuous mass of air bubbles within the continuous mass of wastewater. The draft tube evaporator preferably includes an air injection tube that disperses the gas into a liquid, such as a downcomer, and a weir forming a generally vertical channel open at both a top end and a bottom end. The weir extends from beneath the top surface of the liquid upwardly toward the top surface. Preferably, the top end of the weir is disposed at or a short distance below the top surface of the liquid. A confined space is formed between the weir and the outer surface of the downcomer. The confined space may be an annular confined space between a cylindrical downcomer and a cylindrical weir.

In some optional preferred arrangements, the draft-tube evaporator includes a partially enclosed vessel arranged to be disposed within an open reservoir of the wastewater, such as an open tank. The vessel is preferably arranged to be disposed in an operative position at the top surface of the wastewater in the reservoir. The vessel may be arranged to float in a non-fixed operative position at the top surface of the wastewater. The vessel may be supported in a fixed operative position at the top surface of the wastewater, for example with one or more rigid supports, such as braces or legs. The vessel defines a confined space. The vessel optionally includes an air dispersion chamber inside the confined space for directly mixing the air into the wastewater. The vessel may include an air duct and/or a downcomer for operatively connecting the air blower with the air dispersion chamber. The air dispersion chamber may be defined by a weir that allows vertical circulation of the wastewater. The vessel include an exhaust port arranged to allow water vapor to exhaust from the vessel. A tortuous pathway may connect the air dispersion chamber to the exhaust port. The vessel may have a top portion to be disposed above the top surface and a bottom portion to be disposed in the wastewater in the operative position. The liquid evaporator may be secured to the reservoir or may be separate from the reservoir.

In some optional preferred arrangements, the draft-tube evaporator may include an enclosed aeration tank arranged to receive and hold the wastewater. The aeration tank preferably includes a shell defining an interior, an inlet for allowing wastewater to be supplied into the interior, a downcomer that extends into the interior, a weir adjacent the downcomer, an exhaust outlet to allow exhaust gases and water vapor to exhaust from the interior, and/or a discharge outlet to allow wastewater to be removed from the tank. The draft tube preferably extends downwardly into the interior and has an air discharge outlet to be disposed under the top surface of the wastewater inside the aeration tank. The weir is disposed adjacent the air discharge outlet. The weir may be arranged to allow vertical circulation of the wastewater around the weir. The weir may have the form of a vertically oriented wall that encircles or surrounds the outlet of the draft tube and defines the air dispersion chamber. The weir may be a cylindrical wall. The weir preferably has a bottom edge spaced above a bottom wall of the tank and below the outlet of the draft tube. The weir also preferably has a top edge spaced above the outlet of the draft tube and below the top surface of the water.

Air may be drawn through the liquid evaporator under either or both of positive pressure or negative pressure. For example, the air blower may be arranged to push the air under positive pressure through the downcomer into the air dispersion chamber. In other arrangements, the air blower may be arranged to pull the air under negative pressure out of the air dispersion chamber, thereby forming a vacuum in the dispersion chamber that pulls air through the downcomer. Optionally, a first air blower may be arranged to push the air through the downcomer and a second air blower may be arranged to pull the air out of the air dispersion chamber. The air blower may be any mechanism capable of moving air, such as a fan, pump, positive or negative displacement pump, and the like.

In some optional preferred arrangements, the liquid evaporator includes one or more demisters arranged to separate entrained water from the water vapor and gases before being exhausted from the liquid evaporator.

In some optional preferred arrangements, the system may include one or more liquid evaporators arranged to evaporate water vapor from the wastewater. Two or more of the liquid evaporators may be connected in parallel. Two or more of the liquid evaporators may be connected in series.

Each of the optional features and/or aspects disclosed herein may be operatively combined with any one or more of the other optional features disclosed herein in any manner that would be apparent to one or ordinary skill. Each such combination is specifically contemplated and included herein as an optional arrangement of this disclosure These and other aspects of the disclosure will be apparent in view of the following detailed description, claims, and the drawings.

DETAILED DESCRIPTION

Figure 1:
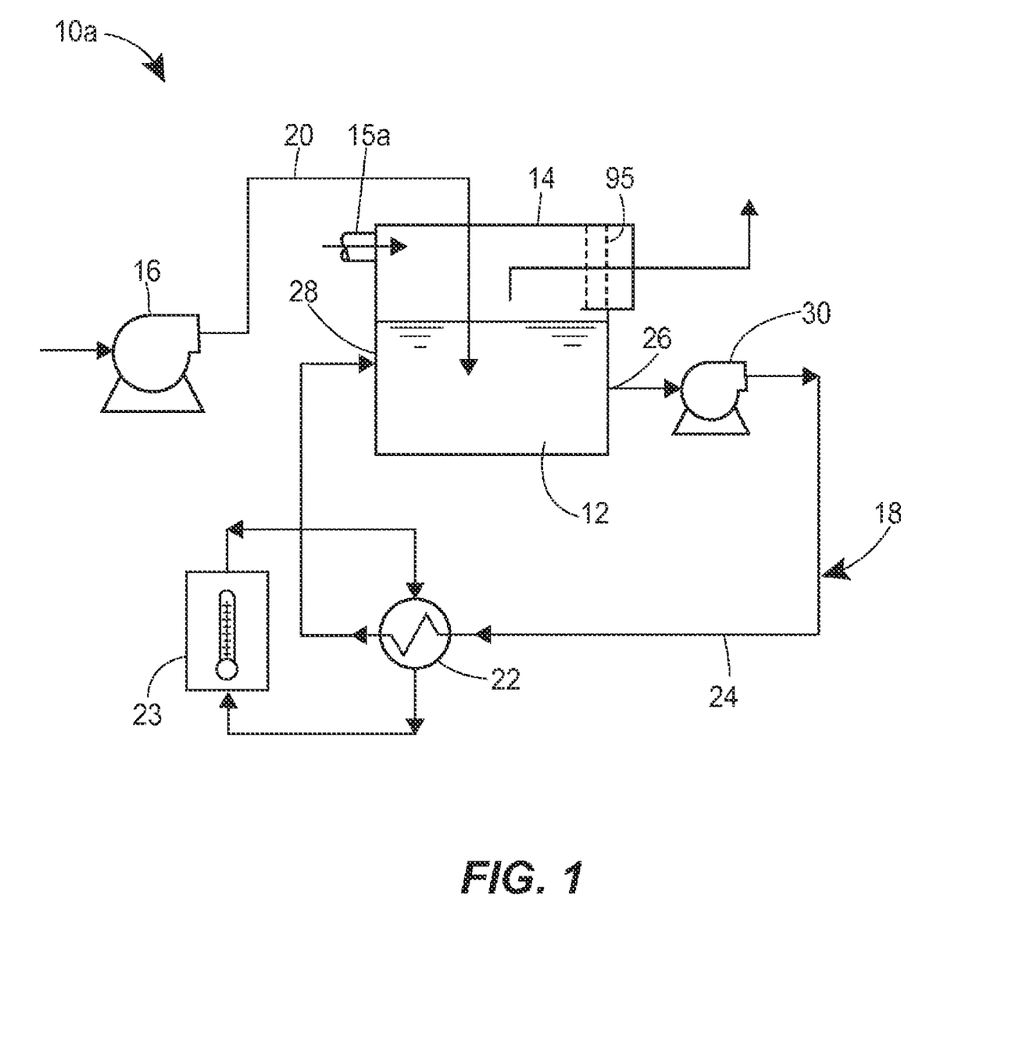
FIG. 1 is a schematic diagram of a liquid evaporation system exemplifying some aspects of the disclosure.

Turning now to FIG. 1, a liquid evaporation system 10a exemplifying some teachings of the present application is arranged for evaporating water vapor from heated wastewater by intensely mixing air with a volume of hot wastewater 12. The air may be ambient temperature or heated above ambient temperature. The term "ambient temperature" refers to air that is substantially the same temperature as the surrounding external environment without being substantially heated or cooled by additional processes or devices. The term "heated" means actively and/or intentionally heated above ambient temperature. The term "hot wastewater" refers to wastewater that has a temperature that is significantly higher than the surrounding external environment. The air and the hot wastewater are mixed such that water vapor evaporates from the wastewater into the air. Preferably, the air is humidified with water vapor from the wastewater to near 100% saturation at a temperature close to the temperature of the hot wastewater. In order to promote and/or increase the evaporation of water vapor into the air, heat energy is added to the volume of wastewater 12. The liquid evaporation system 10a preferably operates with temperatures of the volume of wastewater 12 being between approximately 100° F. and 170° F., although other temperature ranges above and/or below the preferred temperature range may be used.

The liquid evaporation system 10a includes a liquid evaporator 14, an air blower 16, such as a fan, arranged to blow air and/or other gases into the liquid evaporator 14, and a wastewater heating system 18, such as any one of the heating systems disclosed herein, arranged to heat the volume of wastewater 12.

The liquid evaporator 14 may be any liquid evaporation system arranged to accelerate evaporation of water vapor from wastewater to separate the water from the wastewater. Preferably, the liquid evaporator 14 includes a direct contact adiabatic evaporation system that increases the rate of evaporation of liquid from the wastewater by forcing air into wastewater within the confines of the liquid evaporator and allowing controlled release of moist exhaust air containing water vapor after mixing with the wastewater to reduce, control, and/or eliminate dispersion of entrained wastewater with the exhaust air into the surrounding atmosphere. This separates water in the wastewater from the contaminants by evaporating the water to the surrounding environment with the moist exhaust air while leaving contaminants, such as sulfur, salts, and suspended solids, in the wastewater. Some possible exemplary liquid evaporators may include any of the exemplary liquid evaporators described herein in the detailed description or in the background, or liquid evaporation systems that may be found elsewhere. The liquid evaporator 14 preferably is or includes a draft tube evaporator that vigorously mixes air as a discontinuous mass in a continuous mass of wastewater, such as by injecting air through the draft tube into the mass of wastewater 12, thereby forming a discontinuous mass of air bubbles within the continuous mass of wastewater. The wastewater 12 may be in an open reservoir, such as an open tank 12a or pond, as shown in FIGS. 3A-3C and 5; however, the wastewater 12 may be in an enclosed reservoir, such as an enclosed tank 12c or vessel, as shown in FIG. 4. Thus, the liquid evaporator 14 may include a partially enclosed vessel arranged to be disposed within an open reservoir of the wastewater, such as an open tank. The liquid evaporator 14 may include an enclosed aeration tank arranged to receive and hold the wastewater. The liquid evaporator 14 operatively receives the wastewater 12 and is arranged to evaporate and separate water vapor from the wastewater. Air supplied from the air blower 16 is intimately mixed with wastewater inside the liquid evaporator, and the water vapor travels through an enclosed exhaust pathway through the liquid evaporator 14 from the surface of the wastewater to an exhaust port. As the exhaust air travels along the exhaust pathway, entrained wastewater droplets or contaminants are removed from the exhaust air by contacting and collecting on the walls of the exhaust pathway and/or demister structures, such as baffles, screens, and/or other collection structures. Thus, the exhaust pathway preferably follows a tortuous path through the liquid evaporator between the top surface of the wastewater inside the liquid evaporator 14 to the exhaust port to increase contact of the exhaust air with collection surfaces and/or demister structures before the exhaust air escapes from the liquid evaporator. The liquid evaporator 14 in some arrangements may have any one or more features and arrangements of the exemplary liquid evaporators shown in FIGS. 3A-5 and described in additional detail hereinafter.

The air blower 16 is operatively connected to the liquid evaporator 14 with an air supply line 20, such as a pipe or hose, to force air and/or other gases into the liquid evaporator 14. The air blower 16 preferably blows ambient temperature air, such as air at a temperature below approximately 100-110° F., which generally allows use of less expensive materials of construction, such as PVC, plastic, and other engineered materials, for the construction of the air supply line 20 and/or the liquid evaporator 14. Blowing ambient temperature air may also reduce energy requirements in comparison to a heated air blower. Alternatively, the air blower may operatively supply heated air to the liquid evaporator, such as heated exhaust or other heated air from a waste heat source in the industrial plant. Preferably, the air blower 16 is located remote from the liquid evaporator 14, and the air supply line 20 is or includes a flexible hose or pipe that allows the liquid evaporator 14 to be placed remote from the air blower 16.

Figure 6:
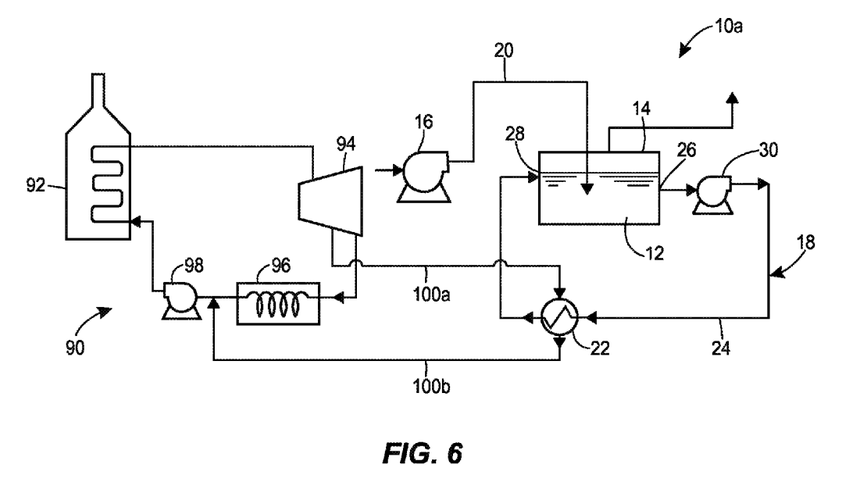
FIGS. 6-8 are schematic diagrams of liquid evaporation systems of the present disclosure connected to different waste heat sources exemplifying additional aspects of the disclosure.
Figure 7:
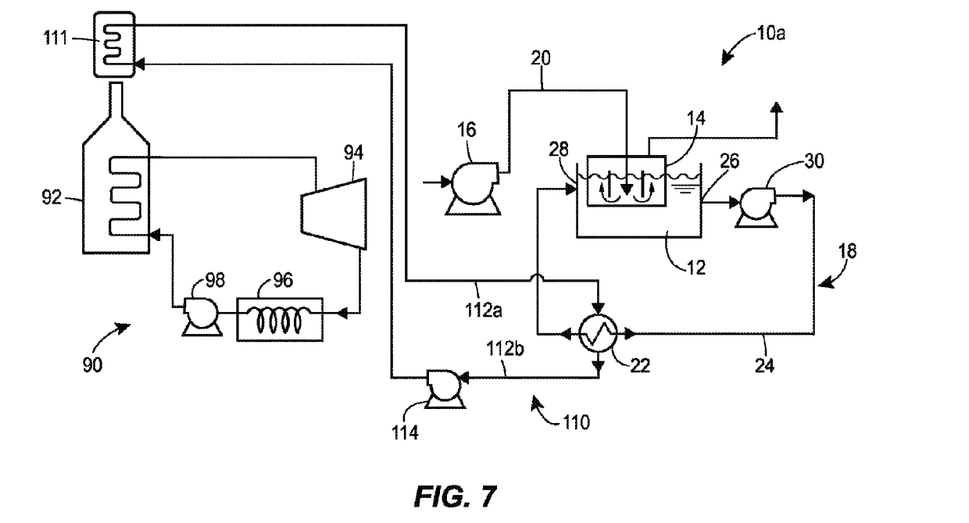
Figure 8:
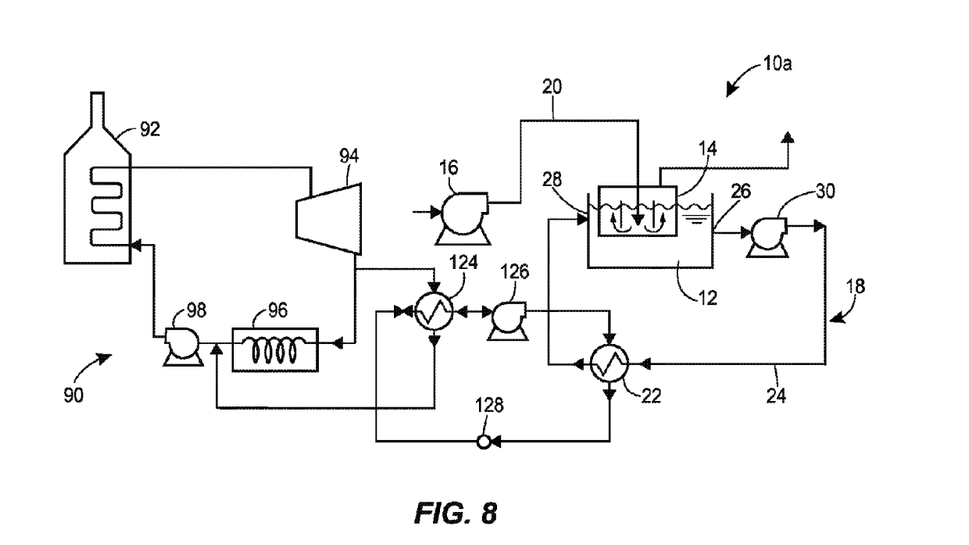

The wastewater heating system 18 is arranged to heat the wastewater 12, preferably by capturing heat energy from exhaust heat from a separate source and transferring the exhaust heat into the wastewater 12. The wastewater heating system 18 may provide heat energy, for example, by circulating heated water and/or wastewater to the liquid evaporator 14 at a temperature above approximately 115° F. The wastewater heating system 18 includes a heating loop that circulates water and/or wastewater in the liquid evaporator 14 through a heat exchanger 22. The heat exchanger 22 is connected with a heat source, such as an exhaust or other waste heat source 23 from a nearby industrial process, flare stack, engine, or other source of combustion energy. Some exemplary waste heat sources 23 that may be connected with the heat exchanger 22 are shown in FIGS. 6-8 and discussed in further detail hereinafter. The wastewater heating system 18 includes a circulation line 24, such as a pipe configured in a loop having an outlet 26 arranged to collect wastewater from the liquid evaporator 14 and returning to an inlet 28 arranged to return wastewater into the liquid evaporator 14. The circulation line 24 is operatively connected with the heat exchanger 22 such that heat from the waste heat source 23 heats the wastewater as it flows through the heat exchanger 22 and the heated wastewater is returned to the inlet 28 at a greater temperature than the wastewater entering the line 24 at the outlet 26. A pump 30 preferably is operatively disposed along the line to circulate the wastewater from the outlet 26 to the inlet 28 and through the heat exchanger 22. The heat exchanger 22 and the pump 30 may take any form appropriate for a given set of variables as would be readily understood by a person of ordinary skill.

The wastewater 12 is supplied to the liquid evaporator 14 by any suitable mechanism, such as a supply pipe 15a. The wastewater may be collected, for example, from a source of wastewater within an industrial plant. However, the wastewater 12 may be supplied from any suitable source. The supply pipe 15a may connect to a supply inlet into the liquid evaporator 14 separate from the heating system 18. The supply pipe 15a may connect into the circulation line 24 of the heating system 18. Other arrangements, for operatively supplying the wastewater 12 to the liquid evaporator 14 are also possible and contemplated.

In operation, the air blower 16 forces air through the air supply line 20 into the liquid evaporator 14. As air from the air blower 16 circulates through the liquid evaporator 14, the air and wastewater vigorously mix together, preferably within the interior of a confined chamber, and water vapor evaporates out of the wastewater 12 in the confined chamber to rapidly evaporate relatively clean water from the wastewater into the gas. Preferably, use of the confined chamber prevents gas from carrying entrained droplets of wastewater and/or entrained particles away from the liquid evaporator 14. The liquid evaporator 14 separates the air and water vapor from the wastewater and exhausts the water vapor and gas, preferably to the surrounding atmosphere. Preferably, any wastewater and/or particles removed from the gas and water vapor is returned to the wastewater 12.

As air is blown through the liquid evaporator 14, the wastewater heating system 18 heats the wastewater in the liquid evaporator 14, thereby causing more rapid evaporation of water from the wastewater in the liquid evaporator 14 than with ambient temperature wastewater. The pump 30 pumps the wastewater through the circulation line 24 from the outlet 26 to the inlet 28. The wastewater flows out of the liquid evaporator 14 from the outlet 26, through the heat exchanger 22, and back to the liquid evaporator at the inlet 28. Heat from the waste heat source 23 is transferred into the wastewater at the heat exchanger 22, and thereby transferred into the wastewater 12 when the wastewater returns through the inlet 28.

Figure 2:
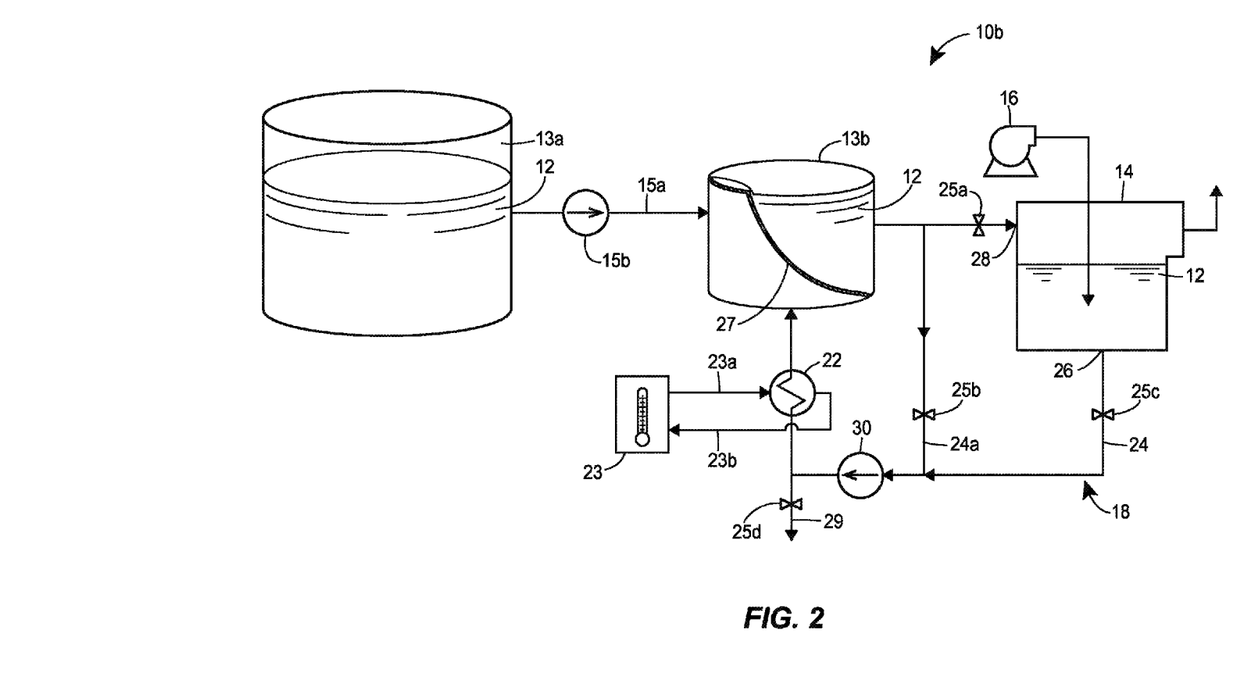
FIG. 2 is a schematic diagram of another liquid evaporation system exemplifying additional aspects of the disclosure.

In FIG. 2, another liquid evaporation system 10b has a large reservoir 13a of wastewater. The wastewater in the large reservoir 13a may be at ambient temperature or above or below ambient temperature. The large reservoir 13a holds a large enough volume of wastewater that it would be very difficult to efficiently or effectively heat all of the wastewater directly within the reservoir and evaporate the wastewater directly within the reservoir. In this example, the large reservoir 13a may be tens of thousands of gallons or hundreds of thousands of gallons or more of wastewater. To overcome the difficulty of heating such a large volume of the wastewater, the liquid evaporation system 10b separates the liquid evaporator 14 from the large reservoir 13a of ambient wastewater to allow smaller volumes of the wastewater 12 to be heated apart from the large reservoir 13a before being supplied to the liquid evaporator.

The liquid evaporation system 10b includes a thermal holding tank 13b, the liquid evaporator 14, the air blower 16, and the wastewater heating system 18. Wastewater is supplied from the large reservoir 13a to the thermal holding tank 13b by way of a conduit, such as supply pipe 15a, that operatively connects the large reservoir 13a to the thermal holding tank 13b. A pump 15b is optionally operatively disposed along the supply pipe 15a to pump wastewater through the conduit from the large reservoir 13a to the thermal holding tank 13b. The thermal holding tank 13b is preferably significantly smaller than the large reservoir 13a. The chosen size of the holding tank 13b is dependent on many different variables, which may include, for example, the desired rate of evaporation from the liquid evaporator 14, the temperature of the waste heat source 23, the rate of recirculation through the wastewater heating system 18, the size and efficiency of the heat exchanger 22, and the temperature/humidity of the ambient air. For example, the holding tank 13b may be quite small if the rate and/or efficiency of heat exchange at the heat exchanger 22 is large, and the holding tank 13b may be eliminated entirely if the rate of heat exchange at the heat exchanger 22 is large enough. Preferably, the thermal holding tank 13b has a holding capacity of between about ten gallons and about ten thousand gallons. The thermal holding tank 13b is operatively connected to the wastewater heating system 18. For example, the circulation line 24 connects the thermal holding tank 13b, the liquid evaporator 14, the pump 30, and the heat exchanger 22 in a heating loop. The pump 30 is arranged to pump wastewater from the thermal holding tank 13b to the inlet 28 of the liquid evaporator, from outlet 26 of the liquid evaporator 14 to the heat exchanger 22, and from the heat exchanger 22 back to the thermal holding tank 13b.

The wastewater heating system 18 is operatively connected to the waste heat source 23 for heating the wastewater 12. Specifically, heat from the waste heat source 23 is transferred to the heat exchanger 22 by appropriate conduits 23a to heat the wastewater flowing through the heat exchanger 22. Any residual heat from the heat exchanger may optionally be returned to the waste heat source 23 by appropriate conduits 23b. Heated wastewater then cycles from the heat exchanger 22 into the thermal holding tank 13b where it is held until it is delivered to the liquid evaporator 14 or, alternately is recirculated back to heat exchanger 12 through pump 30 if additional heat is to be added to the wastewater. Heated wastewater from the thermal holding tank is then supplied to a liquid evaporator 14 through the circulation line 24 into the inlet 28.

The thermal holding tank 13b optionally is insulated to retain as much heat within the wastewater as practicable. For example, the thermal holding tank 13b is surrounded and/or enveloped with thermal insulation 27, such as foam, fiberglass, earth, wood, etc., as is understood in the art.

The liquid evaporator 14 is operatively connected to the air blower 16 to force air and/or other gases into the liquid evaporator to rigorously mix the air directly with the wastewater to evaporate water vapor from the wastewater as described elsewhere herein. Water vapor is exhausted from the liquid evaporator 14. As with the liquid evaporation system 10a, the liquid evaporator 14 may have any of the various forms disclosed herein.

Optionally, discharge of more concentrated wastewater is selectively removed from the liquid evaporator 14 to maintain the level of total dissolved solids in the wastewater in liquid evaporator 14 at or below a pre-selected level. Thus, a blowdown line, such as discharge line 29, is operatively connected to the circulation loop 24 to allow wastewater to be discharged. The discharge line 29 is preferably operatively disposed between the liquid evaporator 14 and the heat exchanger 22 but may be operatively located at the liquid evaporator 14, at the thermal holding tank 13b, and/or elsewhere along the heating loop. A flow control valve 25d is preferably operatively arranged to stop or allow flow of concentrated wastewater through the discharge line 29. The blowdown line allows the liquid evaporation system 10b to run continuously by providing a way to transfer concentrated wastewater out of the system while controlling equilibrium levels of total solids within the liquid evaporator 14 without having to add another pump to the system. That is, the pump 30 preferably provides for both recirculation of the wastewater 12 through the heat exchanger 22 and also transfers concentrated wastewater away from the liquid evaporation zone in the liquid evaporator 14. The liquid evaporation system 10a may also be provided with a blowdown line in the same or similar arrangement.

Optionally, the wastewater heating system 18 may include an evaporator bypass line 24a that optionally and selectively allows wastewater in the circulation loop to bypass the liquid evaporator 14. The bypass line 24a has a first end that is operatively connected to the circulation line 24 between the thermal holding tank 13b and the liquid evaporator 14 and a second end that is operatively connected to the circulation line 24 between the liquid evaporator 24a and the heat exchanger 22. Flow control valves 25a, 25b, and 25c are optionally operatively located along the circulation line and the bypass line 24a to allow selectively directing the wastewater to circulate through the liquid evaporator 14 and/or to bypass the liquid evaporator 14 through the bypass line 24a. The flow control valve 25a is operatively located on the inlet side of the liquid evaporator 14 to selectively stop or allow flow of wastewater into the liquid evaporator from the thermal holding tank 13b. The flow control valve 25b is operatively located along the bypass line 24a to selectively stop or allow flow of wastewater through the bypass line 24a. The flow control valve 25c is operatively disposed on an outlet side of the liquid evaporator 14 to selective stop or allow flow of wastewater out of the liquid evaporator.

In operation, flow volume of wastewater into the liquid evaporator 14, such as through the valve 25a and the inlet 28, assuming valve 25c is closed and valve 25b is open, is preferably equal to the evaporation rate from the liquid evaporator 14.

Figure 3A:
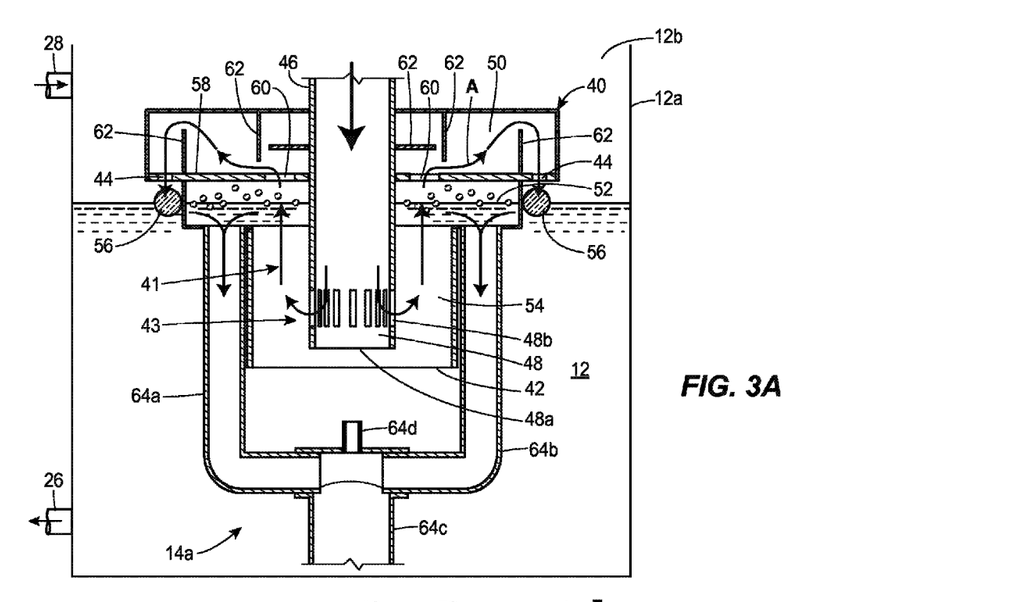
FIG. 3A is a detailed cross-sectional view of an example liquid evaporator useable in a liquid evaporation systems of the present disclosure.
Figure 3B:
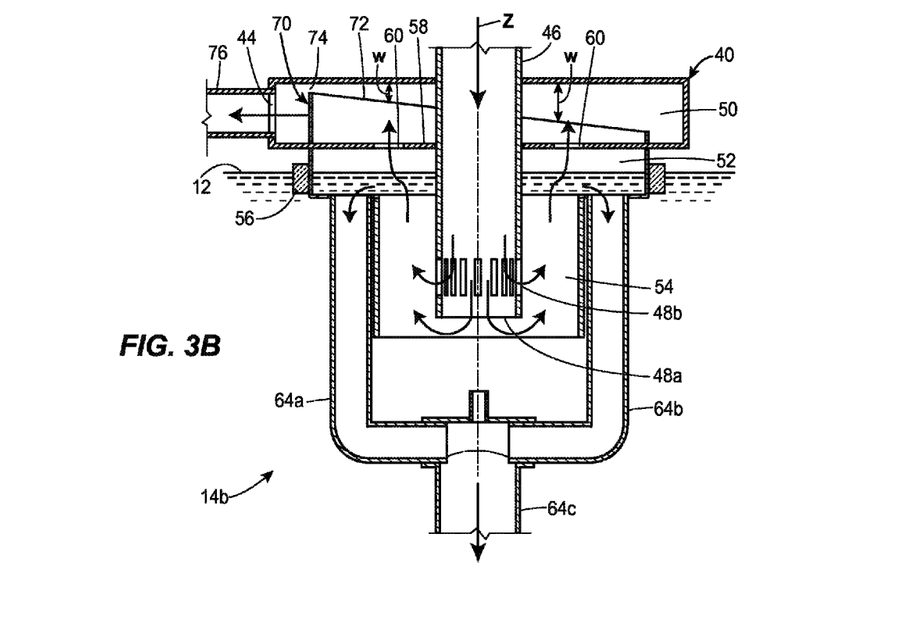
FIG. 3B is a detailed cross-sectional view of another example liquid evaporator useable in the liquid evaporation systems of the present disclosure.
Figure 3C:
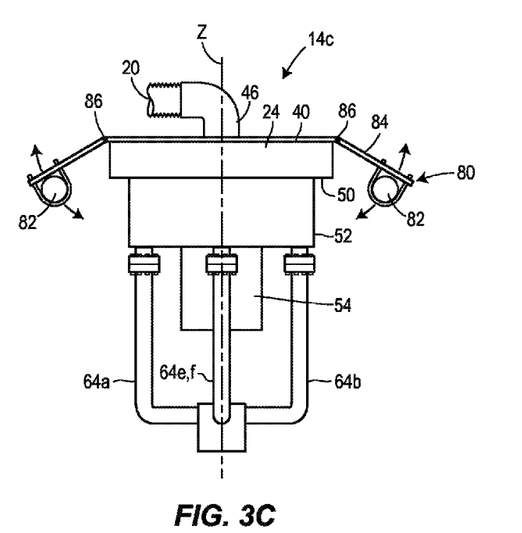
FIG. 3C is a side view of a further example liquid evaporator useable in the liquid evaporation systems of the present disclosure.
Figure 4:
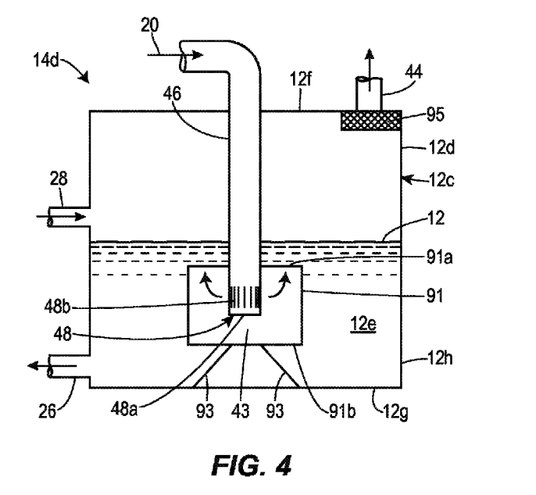
FIG. 4 is a detailed cross-sectional view of yet another example liquid evaporator useable in the liquid evaporation systems of the present disclosure

FIGS. 3A, 3B, 3C, and 4 show some exemplary liquid evaporators 14a, 14b, 14c, and 14d including direct contact adiabatic evaporation systems that may be used as the liquid evaporator 14 in the liquid evaporation systems 10a and 10b. However, the liquid evaporator 14 may have other forms and is not limited to the exemplary liquid evaporators shown in FIGS. 3A-4. FIGS. 3A, 3B, and 3C show different exemplary arrangements of a liquid evaporator having a draft tube evaporator disposed in an open reservoir. FIG. 4 shows an exemplary liquid evaporator having a draft tube evaporator formed in an enclosed tank. A brief description of the exemplary liquid evaporators 14a, 14b, 14c, and 14d is provided herein. However, additional detailed description of the liquid evaporators 14a, 14b, and 14c may be found in U.S. Patent Application No. 61/614,601, which is incorporated by reference herein in its entirety. Additional detailed description of the liquid evaporator 14d may be found in U.S. Patent Application Publication No. 2008/0174033, which is incorporated by reference herein in its entirety.

In the exemplary arrangement of FIG. 3A, the liquid evaporator 14a has a body defining a partially enclosed vessel 40 that floats on or is otherwise maintained in an operative position in and at a top surface of the wastewater 12. The top surface of the wastewater is located between a top portion of the vessel 40 disposed above the wastewater and a bottom portion of the vessel 40 disposed in the wastewater. The wastewater 12 is preferably contained within an open reservoir, such as a tank 12a having an open top 12b. The vessel 40 defines an interior space 41 that is confined by the walls of the vessel. An opening 42 through a submerged portion of the vessel 40 allows wastewater to enter into the bottom portion of the interior space 41. The bottom portion of the interior space 41 is in fluid communication with the upper portion of the interior space 41 such that water vapor may travel from the bottom portion into the top portion. The top portion of the interior space 41 at least partly defines an exhaust path A from the top surface of the wastewater to one or more exhaust ports 44 to the surrounding environment. The exhaust ports 44 are operatively located above the top surface of the wastewater. An air downcomer 46, which is arranged to be connected to the air supply line 20, has a discharge outlet 48 disposed inside the bottom portion of the confined space 41. The discharge outlet 48 includes an open bottom end 48a of the air downcomer 46 and a plurality of sparge ports 48b through the sidewall of the air downcomer 46 adjacent the open bottom end 48a. The area where the discharge outlet 48 is located in the bottom portion of the confined space 41 forms an air dispersion chamber 43 during operation of the liquid evaporator. Thus, in the operative position, the air pump 16 forces air through the air supply line 20 into the air dispersing chamber 43, where the air mixes vigorously with the wastewater. The air then moves naturally to the top surface of the wastewater inside the interior space 41 and travels through the exhaust pathway A to be exhausted out of the vessel 40 out through the exhaust ports 44 as moist exhaust air containing water vapor, while concentrated wastewater and contaminants are trapped within the vessel 40 and returned to the wastewater. In this manner, water vapor is evaporated and separated out from the wastewater without allowing uncontrolled dispersion of the wastewater into the surrounding environment. The liquid evaporator 14a may be maintained in the operative position at the top surface of the wastewater 12 by any convenient mechanism, such as support legs, a suspension structure, and/or flotation.

In one optional arrangement, the interior space 41 of the vessel 40 includes an upper chamber 50, a middle chamber 52, and a lower chamber 54, which are in fluid communication with each other. An open bottom end of the lower chamber 54 defines the opening 42. An open top end of the lower chamber 54 connects with an opening at the bottom of the middle chamber 52. In the operative position, the top level of the wastewater extends through the middle chamber 52, such that the lower chamber 54 and a lower portion of the middle chamber 52 are disposed in the wastewater and the upper chamber 50 and the upper portion of the middle chamber 52 are disposed above the wastewater 12. The air dispersion chamber 43 is defined inside the lower chamber 54. Floats 56 carried by the vessel 40 are located so as to maintain the liquid evaporator 14a in the operative position. The exhaust ports 44 are directed downwardly toward the top surface of the wastewater 12. The downcomer 46 extends down through the top of the vessel 40, into and through the upper chamber 50 and the middle chamber 52, and into the lower chamber 54. The discharge outlet 48 is spaced above the opening 42 a space sufficient to ensure that air discharged through the discharge outlet 48 does not exit through the opening 42 under normal operating conditions. A baffle 58 separates the upper chamber 50 from the middle chamber 52. Openings 60 through the baffle 58 allow water vapor to pass from the middle chamber 52 to the upper chamber 50. Demisting structures 62 are disposed in the upper chamber in and/or across the exhaust path A to form a tortuous path from the openings 60 to the exhaust ports 44. Liquid discharge tubes 64a, 64b extend down from the middle chamber 52 on opposite sides of the lower chamber 54. The liquid discharge tubes 64a, 64b merge into a single discharge riser 64c below the vessel 40. An air vent tube 64d is located at the top of the discharge ricer 64c at the junction of the discharge pipes 64a and 64b. The air vent tube 64d is substantially smaller than the liquid discharge tubes 64a, 64b or discharge riser 64c. The discharge riser 64c extends downwardly toward the bottom of the tank 12a. The liquid evaporator 14a is preferably fabricated almost entirely from plastics, such as polyvinyl chloride, and functions in a manner understood in the art.

In the exemplary arrangement of FIG. 3B, the liquid evaporator 14b is adapted for use in a multi-stage system that uses the evaporator 14b as an intermediate in-line unit with a connection for transferring the exhaust water vapor to another processing step, such as another liquid evaporator, or to a remote exhaust location. As with the liquid evaporator 14a, the wastewater 12 is preferably contained within an open reservoir, such as the tank 12a (not shown). The liquid evaporator 14b is substantially similar to the liquid evaporator 14a with the exception that, in the upper chamber 50, the liquid evaporator 14b has only a single exhaust port 44 for connection to another transfer conduit instead of a plurality of exhaust ports 44, and the liquid evaporator 14b has a single bustle 70 instead of the baffles 62. The vessel 40, the downcomer 46, and the exhaust path A are preferably arranged symmetrically about a vertical axis Z, and the exhaust port 44 is non-symmetrically arranged about the vertical axis Z at a single location on one side of the top chamber 50. All other portions of the evaporator 14b are preferably the same as the corresponding portions on the evaporator 14a and will not be described again for the sake of brevity. The bustle 70 is arranged to allow the non-symmetrically located exhaust port 44 to draw off air and water vapor from inside the top chamber 50 so as to maintain radially symmetrical flow of air upwardly from the sparge ports 48b and through the lower and middle chambers 54 and 52. Thus, the bustle 70 is arranged to cause uniform radially outwardly mass flow of air at all circumferential locations around the bustle 70 from a region inside the bustle 70 to a region outside of the bustle 70 to the exhaust port 44. The bustle 70 is formed of a circumferential wall 72, preferably a cylindrical wall, extending upwardly from the baffle 58 part way to the top interior wall of the upper chamber 50. The circumferential wall 72 is spaced radially between the outer peripheral wall of the upper chamber 50 and the openings 60, thereby forming an inner volume encompassed by the bustle 70 and an outer peripheral volume between the bustle 70 and the outer peripheral wall. The circumferential wall 72 defines a gap 74 between the inner volume and the outer peripheral volume. The gap 74 has a continuously variable width W along the length of the wall 72. The gap 74 has a smallest width W (e.g., the wall 72 is tallest) immediately adjacent the location of the exhaust port 44. The gap 74 has a largest width W diametrically opposite the location of the exhaust port 44. In the present example, the circumferential wall 72 is cylindrical and has a top edge that defines an inclined plane with its highest point adjacent the exhaust port 44 and its lowest point diametrically opposite from the exhaust port 44. Preferably, each of the gap 74, the downcomer 46, and the exhaust port 44 defines the same cross-sectional air flow area. Other bustle designs capable of providing or improving uniform radial mass flow of the air outwardly from the inner volume 24b are also possible, such as those disclosed in U.S. Pat. No. 7,442,035, which is incorporated by reference herein in its entirety. The exhaust port 44 is optionally connected to a conduit 76 that is operatively connected to another instrument, such as another evaporator. The exhaust port 44 may alternatively exhaust to air or be connected to some other device.

In the exemplary arrangement of FIG. 3C, the liquid evaporator 14c is substantially similar to the liquid evaporators 14a and/or 14b, but with the addition of an adjustable stabilization system 80 and additional discharge tubes 64e and 64f. As with the liquid evaporators 14a and 14b, the wastewater 12 is preferably contained within an open reservoir, such as the tank 12a (not shown). Also like the previously described liquid evaporators 14a and 14b, the liquid evaporator 14c includes the partially enclosed vessel 40 having the middle chamber 52 disposed between the upper chamber 50 and the lower chamber 54, the air supply downcomer 46 arranged for connection to the air supply line 20 for injecting air into the air dispersion chamber 43 formed by the lower chamber 54, and internal baffles 62 and/or the bustle 90 (not visible) arranged in the upper chamber 50 to provide a tortuous path to one or more exhaust outlets 44. The discharge tubes 64a,b,e,f are preferably radially spaced equally from the axis Z and preferably spaced at 90° on center around the outer periphery. Further, the outer annular periphery of the lower chamber 54 is spaced radially inwardly from the discharge tubes 64a,b,e,f rather than being located immediately adjacent the discharge tubes as shown for the liquid evaporators 14a and 14a. Preferably, remaining features of the partially enclosed vessel 40 are identical to corresponding features in either of the liquid evaporators 14a or 14b and can be understood with reference to the prior descriptions thereof. The adjustable stabilization system 80 is arranged to help stabilize the liquid evaporator 14c in an upright operative position, i.e., with the axis Z aligned generally vertically, the lower chamber 26 disposed in the wastewater 12, and the upper chamber disposed above the wastewater 12 while air is being forced through the air supply downcomer 44 into the lower chamber 26. The stabilization system 80 includes floatation devices 82 operatively secured to the vessel 40 by outriggers 84. The position of the floatation devices 82 may be adjusted axially and/or radially to cause the vessel 40 to sit higher or lower in the wastewater. The flotation devices 82 are disposed diametrically opposite each other on opposite sides of the vessel 40. Each flotation device 82 is spaced radially from the outer annular periphery of the vessel and sized to provide sufficient buoyancy to hold the upper chamber 50 spaced above the top surface of the wastewater 12. The outriggers 84 are formed by two struts arranged in parallel on opposite sides of the downcomer 44 and connected to the top of the vessel. Each strut extends outwardly from opposite sides of the outer annular periphery of the upper chamber 50, and each flotation device 82 is attached near the ends of the struts. One or more hinges 86 in the struts are spaced from the outer annular periphery of the upper chamber 50 and arranged to allow the flotation devices 82 to be selectively raised and/or lowered by pivoting the ends of the struts around the respective hinges. The flotation devices 82 are preferably disposed spaced along an axis of the air supply line 20 over the top of the vessel 40 approaching the downcomer 46. The flotation devices 82 are arranged to counteract rotational forces that act to tip the vessel 40 away from substantially vertical alignment in response to air being forced through the air supply line 20.

FIG. 4 shows the liquid evaporator 14d, which includes an enclosed reservoir, such as an aeration tank 12c, arranged to receive and hold the wastewater 12 and a downcomer 46 arranged to inject air into the wastewater 12. The aeration tank 12c is an enclosed tank including a shell 12d defining an interior 12e. An inlet 28 through the shell 12d allows wastewater to be supplied into the interior 12e. An exhaust outlet 44 through the shell 12d allows exhaust gases and water vapor to exhaust from the interior 12e. The exhaust outlet is disposed in an upper portion of the shell 12d to be located above the top surface of the wastewater 12, such as through a top wall 12f or cover of the shell 12d. A discharge outlet 26 through the shell 12d is arranged to allow wastewater 12 to be removed from the tank 12c, such as by being located adjacent or through a bottom wall 12g of the shell 12d. The size and holding capacity of aeration tank 12c may be chosen based on many different factors, such as supply rate of the wastewater, supply rate of the air, temperature of the wastewater and/or air, desired evaporation rate, anticipated humidity, etc., as is readily understood by a person of ordinary skill in the art.

The downcomer 46 is a hollow tube that extends into the interior 12e. The downcomer 46 has an air discharge outlet 48 located below an anticipated top surface of the wastewater 12. The air discharge outlet 48 has an open bottom end 48a and a plurality of sparge ports 48b. The downcomer 46 extends downwardly into the interior 12e through the upper wall 12f, although in other arrangements, the downcomer 46 may enter the interior in other orientations, such as angled downwardly, horizontal, or upwardly. The downcomer 46 is arranged to be operatively connected to the air blower 16 (not shown), for example, by the air supply line 20. Preferably, the downcomer 46 is in a fixed location. For example, the downcomer 46 may be in the form of a rigid tube or pipe secured by fasteners or another fixed joint to the top wall 12f.

A weir 91 is disposed adjacent the outlet 48. The weir 91 is arranged to allow vertical circulation of the wastewater 12 around the weir. The vertical circulation is in an upward flow between the weir 91 and the air discharge outlet 48, over and across a top edge 91a of the weir, downwardly on an opposite side of the weir 91, and under and back across a bottom edge 91b of the weir 91. The weir 91 has the form of a vertically oriented wall, such as a cylindrical wall that encircles or surrounds the air discharge outlet 48 and a lower portion of the downcomer 46. The bottom edge 91b is spaced above the bottom wall 12g of the aeration tank 12c and below the outlet 48 of the downcomer 46. The top edge 91a is spaced above the outlet 48 of the downcomer 46 and below the top surface of the wastewater 12. The weir 91 forms an air dispersion chamber 43 surrounding the lower portion of the downcomer 46 where air discharged from the air discharge outlet 48 vigorously mixes with the wastewater 12 to evaporate the water vapor.

Supports 93 are arranged to support the weir 91 in a fixed location within the aeration tank 12c. The supports may be in the form of legs extending from the bottom wall 12g, struts attached to one or more side walls 12h of the aeration tank 12c, or other support structures capable of maintaining the weir 91 in the fixed location.

A demister 95 is optionally disposed across the exhaust outlet 44 to remove any entrained wastewater and/or particulates from gases and water vapor exhausting through the exhaust outlet 44. The demister 95 may have any form or arrangement suitable for removing mists from the gases. The demister may, for example, include a chevron demister, a screen, a mesh, or other known demisting structure.

Figure 5:
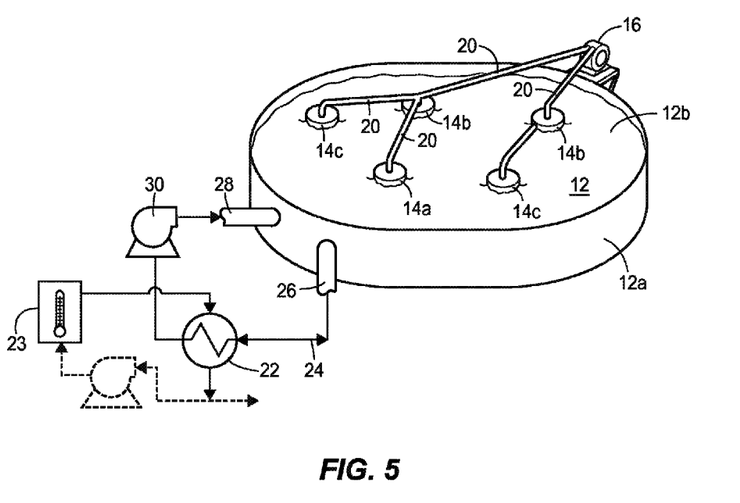
FIG. 5 is a perspective view of a liquid evaporation system according to another aspect of the disclosure including multiple liquid evaporators connected for simultaneous operation in an open reservoir.

The liquid evaporation systems 10a and 10b may include any number of liquid evaporators 14 operatively connected together to evaporate the wastewater faster. In FIG. 5, for example, the liquid evaporation system 10a is shown in an arrangement in which a plurality of liquid evaporators 14a, 14b, and/or 14c are operatively disposed in an open reservoir, such as an open tank 12a, of the wastewater 12. In this arrangement, the air pump 16 is located at the edge of the tank 12a, remote to each of the liquid evaporators 14a/b/c. Each liquid evaporator 14 a/b/c is operatively connected to the air pump 16 by means of one or more of the air supply lines 20. Some of the liquid evaporators 14a/b/c are connected in series by the air supply lines 20 forming a multi-stage evaporation system. Others of the liquid evaporators 14a/b/c are connected in parallel by the air supply lines 20. In other arrangements, a plurality of the liquid evaporators 14d may be similarly connected in parallel and/or in series to increase the evaporative capacity of the overall liquid evaporation system.

FIG. 6 shows the liquid evaporation system 10a with the reservoir heater 18 operatively connected to collect heat energy from a waste heat source in an electrical power plant 90, such as a coal-fired power plant. In this arrangement, the waste heat source is low pressure steam exhausted from a turbine. Very generally, the power plant 90 uses a Rankin cycle that includes one or more boilers 92 that heat water to produce high pressure steam, one or more turbines 94 that use the high pressure steam to produce electricity, one or more condensers 96 that condense steam exiting the turbine(s) 94 back into liquid water, and one or more pumps 98 that pump the water to a higher pressure and send the water back to the boiler 92 to repeat the cycle. In this exemplary arrangement, low pressure steam exhausted from the turbine(s) 94 is also or alternatively conducted directly to the heat exchanger 22, for example by supply pipes 100a. The exhaust steam is cycled through the heat exchanger 22 at the same time as the wastewater from the reservoir 12. The exhaust steam warms the wastewater cycling through the heat exchanger. Water formed through condensation of the exhaust steam in the heat exchanger 22 is returned to the heater boiler 92, for example through return pipes 100b that are operatively connected to the pump(s) 98. Alternatively or additionally, low pressure steam used for other operations in the power plant 90 may be routed through the heat exchanger 22 to warm the wastewater cycling therethrough from the reservoir 12.

FIG. 7 shows the liquid evaporation system 10a operatively connected in the power plant 90 to collect heat energy from the combustion exhaust gases of the boiler 92. In this arrangement, a waste heat transfer circulation loop 110 operatively connects waste heat in the form of the exhaust of the boiler 92 with the heat exchanger 22 to circulate a heat transfer fluid, such as water, oil, and/or glycol, between the boiler 92 and the heat exchanger 22. The waste heat transfer circulation loop 110 includes a heat exchanger 111 to collect heat energy from the combustion exhaust gases from the boiler 92, supply piping 112a to pipe heated water from the heat exchanger 111 to the heat exchanger 22, return piping 112b to return cooled water from the heat exchanger 22 back to the heat exchanger 111, and one or more pumps 114 to circulate the heat transfer fluid through the loop 110. The heat exchanger 111 may be located at any of many different process locations near the boiler 92 that produce waste heat at different temperatures, for example, ranging from approximately 250° F. to approximately 800° F., or higher or lower temperatures. Waste heat energy is transferred from the boiler 92 to the heat exchanger 22 by circulating the heat transfer fluid through the supply piping 112a and return piping 112b with the pump 114 in any sufficient manner.

FIG. 8 shows the liquid evaporation system 10a operatively connected in the power plant to collect waste heat energy from the low pressure steam exhausted from the turbine(s) 94 and processed through a vapor compression cycle or loop 120, such as commonly found in a refrigeration system, to recover waste heat from the low pressure steam and transfer it to the reservoir 12. The vapor compression loop 120 includes a refrigerant that is directed along a piping loop 122 through an evaporator 124, a compressor 126, the heat exchanger 22, an expansion valve 128, and returning to the evaporator 124. The evaporator 124 is arranged to transfer heat from the low pressure steam discharged from the turbine 94 and change the refrigerant from a liquid into a vapor. The compressor 126 is arranged to compress the heated refrigerant vapor to a higher pressure. The heat exchanger 22 is in the form of a condenser where heat from the compressed heated refrigerant vapor is transferred to the heating loop of the reservoir heater 18 and from thence to the reservoir 12. After leaving the heat exchanger 22, the cooled high pressure refrigerant is passed through the expansion valve 128 where the refrigerant is cooled and changes back to the liquid state. The cooled liquid refrigerant is then returned to the evaporator 124, where the cycle is repeated. This arrangement allows the use of waste energy available at lower temperatures to heat the reservoir 12. A similar arrangement may be used to recover waste heat energy from a low temperature combustion gas.

Although the exemplary waste heating arrangements in FIGS. 6, 7, and 8 are shown in combination with the liquid evaporation system 10a of FIG. 1, the waste heating arrangements may be combined with the liquid evaporation system 10b of FIG. 2. For example, this may be accomplished by operatively connecting any of the waste heat supplies described with respect to FIGS. 6, 7, and 8 directly with the heat exchanger 22 of FIG. 2 in the location indicated by the waste heat source 23.

INDUSTRIAL APPLICABILITY

The liquid evaporation systems, components thereof, and methods disclosed herein in some arrangements are useful for improving efficiency in industrial processes and provide environmental benefits. The liquid evaporation systems can be used to capture heat energy from waste heat sources in an industrial process that would otherwise be lost to the atmosphere. The liquid evaporation systems can use the captured heat energy to treat wastewater that may be produced by the industrial process. In this manner, the liquid evaporation systems and components may in some arrangements improve the overall energy efficiency of the industrial process by wasting less heat energy produced by the industrial process and beneficially using captured exhaust heat energy to clean wastewater from the industrial process, thereby reducing at least in some part the energy usage profile of the industrial process.

Numerous modifications to the liquid evaporation systems, components, and methods disclosed herein will be apparent to those skilled in the art in view of the foregoing description. Accordingly, this description is to be construed as illustrative only and is presented for the purpose of enabling those skilled in the art to make and use the invention and to teach the best mode of carrying out same. The exclusive right to all modifications within the scope of the impending claims is expressly reserved.

We claim:

1. A method of evaporating water vapor from a reservoir of a continuous volume of wastewater, the method comprising the steps of:
  evaporating the water vapor with a liquid evaporator including a direct contact adiabatic evaporation system comprising a draft tube assembly that directs air into the continuous volume of wastewater within the reservoir;
  forcing air through the draft tube assembly into the continuous volume of wastewater within the reservoir;

mixing a discontinuous volume of the air in the continuous volume of water; and heating the continuous volume of wastewater with waste heat from an industrial process.

2. The method of claim 1, wherein the step of heating includes the steps of:
collecting exhaust heat energy from the industrial process; and
transferring the collected exhaust heat energy to the continuous volume of volume of wastewater.

3. The method of claim 2, wherein the industrial process comprises an electric power generation plant.

4. The method of claim 1, wherein the draft tube assembly comprises a downcomer and an air dispersion chamber disposed in the continuous volume of wastewater within the reservoir, wherein the downcomer includes an air discharge outlet disposed inside the air dispersion chamber and arranged to vigorously mix gases with the wastewater inside the air dispersion chamber, the method further comprising the steps of:
blowing air through the draft tube into the air dispersion chamber through the air discharge outlet.

5. The method of claim 4, wherein the continuous volume of wastewater is contained in an open reservoir, the liquid evaporator comprises a partially enclosed vessel disposed in the reservoir, the air dispersion chamber disposed inside the partially enclosed vessel, and an exhaust port from the partially enclosed vessel in fluid communication with the air dispersion chamber, the method further comprising the steps of:
disposing the partially enclosed vessel at a top surface of the continuous volume of wastewater;
drawing air into the wastewater inside the air dispersion chamber;
exhausting water vapor from the air dispersion chamber out through the exhaust port.

6. The method of claim 4, wherein the continuous volume of wastewater is contained in an enclosed tank.

7. A liquid evaporation system for evaporating clean water from a reservoir of a continuous volume of wastewater, the liquid evaporation system comprising:
a liquid evaporator having a direct contact adiabatic evaporation system operatively arranged to evaporate and separate water vapor from the volume of wastewater within a confined space, wherein the direct contact adiabatic evaporation system comprises a draft tube assembly that directs air into the continuous volume of wastewater within the reservoir and is arranged to mix a discontinuous volume of the air in the continuous volume of water;
an air blower operatively connected to the draft tube assembly of the liquid evaporator and arranged to supply the air to the liquid evaporator for forming the water vapor; and
and a heating system arranged to heat the continuous volume of wastewater in the reservoir.

8. The liquid evaporation system of claim 7, wherein the heating system comprises a waste heat source from an industrial process.

9. The liquid evaporation system of claim 8, wherein the industrial process comprises an electrical power generation plant.

10. The liquid evaporation system of claim 8, wherein the waste heat source comprises low pressure steam turbine exhaust.

11. The liquid evaporation system of claim 8, wherein the waste heat source comprises combustion exhaust gases.

12. The liquid evaporation system of claim 11, wherein the combustion exhaust gases are captured from a boiler, and the heating system includes a heat exchanger arranged to capture exhaust heat from the exhaust gases.

13. The liquid evaporation system of claim 1, wherein the heating system further comprises:
a heat exchanger hydraulically connected with the volume of wastewater;
a pump arranged to circulate the wastewater from the volume of wastewater to the heat exchanger; and
a waste heat source operatively connected with the heat exchanger;
wherein the heat exchanger is arranged to heat the wastewater with heat from the waste heat source, and the pump is arranged to circulate the heated wastewater from the heat exchanger to the volume of wastewater.

14. The liquid evaporation system of claim 13, further comprising a thermal holding tank operatively connected to the heating system, wherein heated wastewater from the heat exchanger is stored in the thermal holding tank.

15. The liquid evaporation system of claim 14, wherein wastewater is supplied to the liquid evaporator from a holding reservoir, wherein the holding reservoir is operatively connected to the heating system to supply wastewater to the heating system.

16. The liquid evaporation system of claim 13, wherein the waste heat source is operatively connected directly to the heat exchanger.

17. The liquid evaporation system of claim 13, wherein the waste heat source is operatively connected to the heat exchanger with a heat transfer circulation loop.

18. The liquid evaporation system of claim 13, wherein the waste heat source is operatively connected to the heat exchanger with a vapor compression loop.

19. The liquid evaporation system of claim 7, wherein the continuous volume of wastewater is contained in an enclosed vessel defining the confined space, and the draft tube assembly includes a downcomer and a weir disposed in the enclosed vessel and arranged to vigorously mix the discontinuous volume of air with the continuous volume of wastewater.

20. The liquid evaporation system of claim 7, wherein the continuous volume of wastewater is contained in an open reservoir of wastewater, and the draft tube assembly of the liquid evaporator is disposed in the volume of wastewater.

21. The liquid evaporation system of claim 20, wherein the liquid evaporator comprises:
a partially enclosed vessel defining the confined space;
an air dispersion chamber inside the confined space for mixing the air with the wastewater;
a downcomer operatively connecting the air blower with the air dispersion chamber;
an exhaust port hydraulically arranged to allow water vapor to exhaust from the partially enclosed vessel; and
a tortuous pathway operatively connecting the air dispersion chamber with the exhaust port.

22. The liquid evaporation system of claim 20, wherein in an operative position, the partially enclosed vessel is disposed at the top surface of the wastewater having a top portion disposed above the top surface and a bottom portion disposed in the wastewater.

23. The liquid evaporation system of claim 22, wherein the liquid evaporator includes a flotation device operatively secured to the partially enclosed vessel, wherein the floatation device maintains the vessel in the operative position by floating on the top surface of the wastewater.

24. The liquid evaporation system of claim 22, wherein the liquid evaporator is maintained in a fixed position in the operative position by braces or legs.

25. The liquid evaporation system of claim 7, further comprising at least a second liquid evaporator operatively disposed in the wastewater.

26. The liquid evaporation system of claim 19, wherein the liquid evaporator comprises a demister arranged to separate entrained wastewater from the water vapor.

\* \* \* \* \*